United States Patent [19]

Clarke

[11] Patent Number: 4,641,562
[45] Date of Patent: Feb. 10, 1987

[54] CUTTING TOOL FOR MAKING A SMOOTH SAW CUT

[75] Inventor: William Clarke, Bremen, Ga.
[73] Assignee: Bremen Associates Incorporated, Bremen, Ga.
[21] Appl. No.: 766,287
[22] Filed: Aug. 16, 1985
[51] Int. Cl.⁴ ............................................. B27B 33/02
[52] U.S. Cl. ........................................ 83/837; 83/876; 83/676; 83/664; 407/31; 407/55
[58] Field of Search ................ 83/837, 664, 876, 835, 83/676; 407/30, 31, 55, 120; 144/236

[56] References Cited

U.S. PATENT DOCUMENTS

| | | | |
|---|---|---|---|
| 1203 | 6/1839 | Morgan | 83/664 |
| 817,568 | 4/1906 | Huther | 144/236 |
| 1,343,276 | 6/1920 | Olson | 407/31 X |
| 2,659,398 | 11/1953 | Marvin | 144/236 X |
| 4,068,688 | 1/1978 | Benson | 407/31 X |

Primary Examiner—James M. Meister
Assistant Examiner—John L. Knoble
Attorney, Agent, or Firm—Wigman & Cohen

[57] ABSTRACT

The present invention relates to a circular saw blade comprising a first annular saw blade having a plurality of teeth projecting radially from the periphery thereof and a second circular saw blade having a plurality of teeth projecting radially from the periphery thereof. The first blade has a greater diameter and a smaller thickness than the second blade and the teeth on the first blade are angularly set so as to partially extend into the cutting plane of the second blade. The blades are mounted coaxially adjacent to one another such that when used to cut through a workpiece, the first blade makes a fast rough cut and the second blade follows partially within the path of the first blade and provides a smooth, finished cut.

16 Claims, 5 Drawing Figures

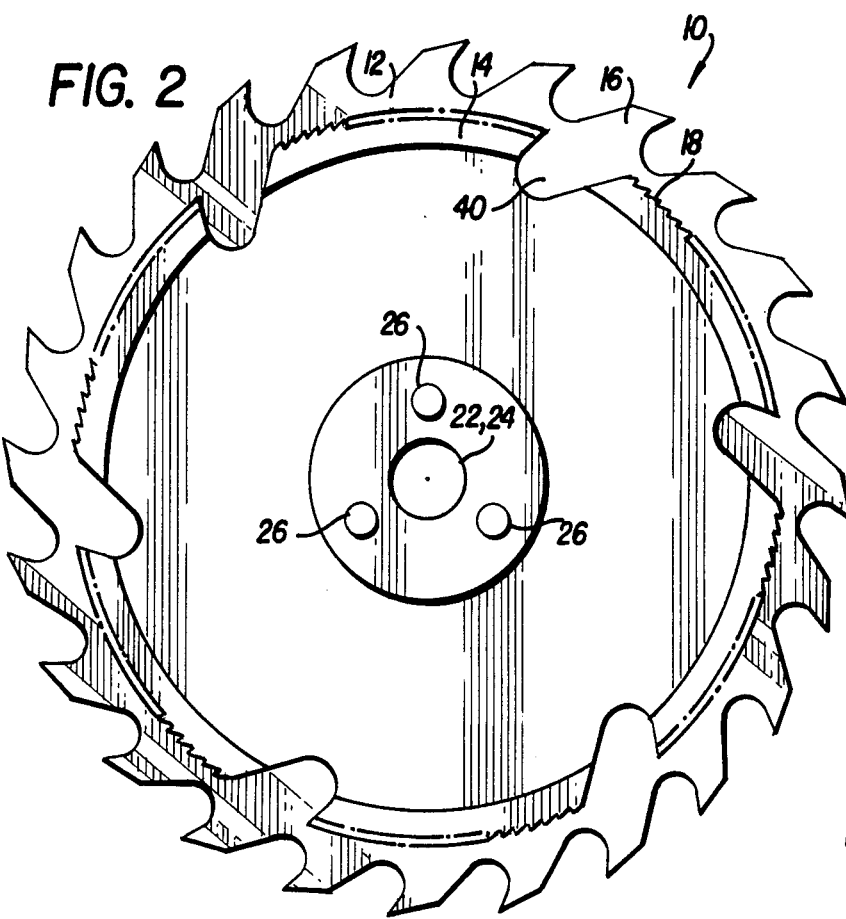
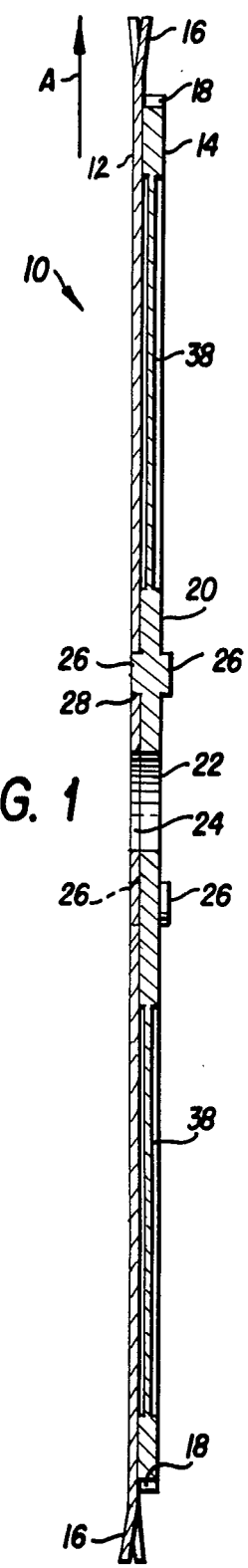
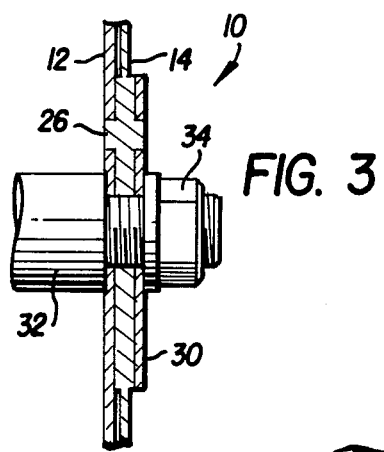
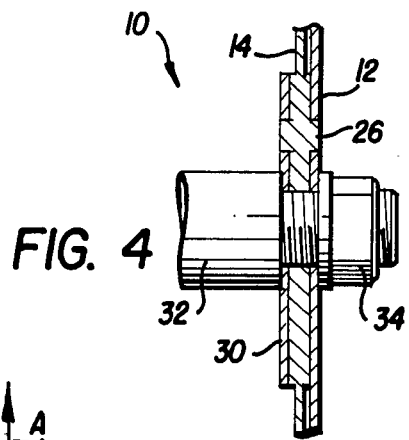
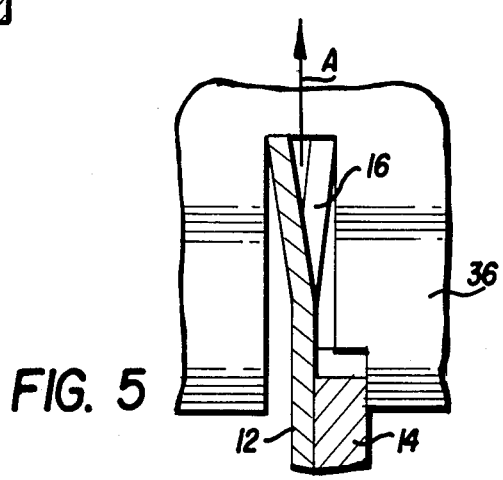

CUTTING TOOL FOR MAKING A SMOOTH SAW CUT

BACKGROUND OF THE INVENTION

The present invention relates to saw blades, and in particular to circular saw blades for cutting wood and making a smooth saw cut.

The prior art circular saw blades broadly fall into one of two categories. One of those categories includes saw blades having relatively large teeth and sometimes referred to as crosscut or ripsaw blades. Such blades are used primarily for making rough cuts in wood either across the grain or along the grain, respectively. The large toothed saws are advantageous in that they have relatively high cutting rates, that is, they are able to make large cuts in short periods of time. However, the edges of the cut surfaces tend to be rather rough and unfinished because the wood is cut away in large chips. Therefore, the cut surfaces must be further finished with a sander or planer to achieve a smooth, finished surface and appearance.

The second category of saw blades includes blades having comparatively small and fine teeth that are primarily used for making finer cuts. The smaller teeth result in a cut with a smooth, finished surface and appearance. However, because of the small size of the teeth, the saw cuts relatively slowly and is not practical for making large cuts at high cutting rates. An example of a blade of this type is a dado blade that is used for routing shallow grooves.

There are also many other cutting blades that do not fit into either of the above categories. For example, U.S. Pat. Nos. 3,323,567 and 3,976,112 are directed to cutting tools used for reducing offal or refuse material to sawdust so that it may be disposed of conveniently. Those tools include a series of coaxially mounted adjacent blades wherein each blade is progressively thicker and larger in diameter than the immediately preceding blade. The larger diameter blades have teeth that are proportionately larger diameter and fewer in number than the smaller diameter blades.

U.S. Pat. No. 1,862,681 discloses tool for surfacing fibrous materials comprising a plurality of blades of similar thickness and diameter mounted coaxially adjacent one another. Adjacent the ends of the tool the blade diameters vary for shaping the ends of the fibrous material up to a larger diameter cut-off saw at the outermost ends of the tool.

U.S. Pat. No. 2,778,394 discloses a tool for sawing and burnishing the cut edge of dense fiberboard or the like. The tool comprises a rough cutting circular trim saw blade having teeth set to one side thereof and a burnishing ring of metal, fiber or sandpaper attached to the other side of the blade. An alternative embodiment of the tool has a circular saw blade having teeth set to one side and the opposite side surface radially inward of the teeth being knurled or treated with abrasive dust adhesively secured to the surface to form a burnishing ring.

U.S. Pat. No. 589,699 is directed to a combination sawing and planing device having a centrally located conventional rough cutting circular saw blade with knife-edged circular or toothed planing discs secured to opposite sides of the central saw blade and spaced therefrom by notched separating discs.

U.S. Pat. No. 3,675,526 discloses a pair of relatively thin circular saw blades of equal diameter welded to each side of a smaller diameter back-up disc having a thickness equal to the combined lateral set of the adjacent teeth of the saw blades.

U.S. Pat. No. 2,716,430 discloses a disc jointer planer having a disc-shaped cutter head which has a toothed periphery and is mounted to a heavier gage disc having a smooth periphery. A washer-shaped spacer is coaxially mounted between the two discs to deflect the lighter toothed disc outward in order to reduce frictional contact between the cut surface and the toothed disc.

Users of the prior art saw blades are constrained to select either a blade for making a fast rough cut or a blade for making a slower smoother cut. Heretofore, there was not available a tool for conveniently making a fast cut that resulted in a cut having a smooth, finished surface and appearance.

A further problem associated with some of the prior art saw blades is that if the saw blade is relatively thin, the teeth of the blade tend to vibrate or wobble when in use. The vibration or wobbling causes the saw blade to cut a path wider and less precise and smooth than would be achievable without vibration or wobbling.

To avoid some of the prior art problems discussed above, it is known in the art of cutting wood to make a first pass with a coarse toothed saw blade followed by a second pass with a finer toothed saw blade to smooth and finish the cut surface.

OBJECTS AND SUMMARY OF THE PRESENT INVENTION

In view of the foregoing limitations of the known saw blades, as well as other disadvantages not specifically mentioned above, it should be apparent that there still exists a need in the art for an improved cut-off saw blade that is capable of making a smooth cut at a favorable cutting rate;

It is, therefore, a primary object of this invention to fulfill that need by providing a novel saw blade combination that is capable of making a smooth cut at a relatively fast cutting rate.

More particularly, it is an object of this invention to provide an improved saw blade and method of using it wherein a first or leading portion of the blade makes a rough cut of a workpiece at a fast rate of speed and a second or trailing portion of the blade finishes the rough cut with a smooth, fine surface.

It is another object of the present invention to provide a saw blade having a set of thin teeth presented in a stable manner so as to prevent vibration and wobbling of the teeth.

Yet another object of the present invention is to provide a cut-off saw blade combination that is able to cut-off wood with a smooth, finished surface in only one pass.

It is another object of the present invention to provide a circular cut-off saw that is adapted to avoid friction and burning of the cut material.

It is still another object of the present invention to provide a pair of coaxially mounted saw blades that are adapted to be reversibly mounted with respect to each other.

Briefly described, the aforementioned objects are accomplished according to the invention by mounting a primary blade, which is a relatively thin circular saw blade with coarse cutting teeth coaxially adjacent a secondary blade, which is a comparatively thicker, smaller diameter blade having smaller teeth for making a smooth finished cut. The teeth of the primary blade are laterally set to both sides at an angle with respect to the planar path of the blade so that the set portion of the teeth of the primary blade extend into the cutting plane of the secondary blade. As a result, the primary blade teeth not only cut wood in the planar path of the primary blade, but also cut a portion of the wood in the planar path of the secondary blade. Thus, the secondary blade, which would normally be designed to make through cuts at a relatively slower speed, is able to make a finishing cut at a speed approaching that of a conventional crosscut or ripsaw blade.

The primary blade has a plurality of angularly spaced holes extending transversely through the blade at equal radial spacing from the central mounting hole of the blade. The holes are located so as to engage a corresponding arrangement of pins projecting laterally from the hub of the secondary blade. Preferably, the pins project from both sides of the secondary blade so that the primary blade may be mounted on either side of the secondary blade to provide right- and left- hand cut-off blades. A small diameter disc with a hole pattern corresponding to the pin arrangement is preferably engaged with the pins on the side of the secondary blade not otherwise engaged by the primary blade. The above-described blade combination may be mounted in a conventional manner on the arbor of a circular saw or other rotatable tool arbor.

A shallow annular recess is preferably formed on the outside surfaces of the secondary blade to reduce friction, and the resulting burning that could be caused by the side surface of the blade rubbing against the cut surface of the wood.

With these and other objects, advantages and features of the invention that may become hereinafter apparent, the nature of the apparatus and method of the invention may be more clearly understood by reference to the following detailed description thereof, the appended claims, and to the several views illustrated in the attached drawings.

BRIEF DESCRIPTION OF THE DRAWINGS

FIG. 1 is an end view taken in cross-section of the saw blade of the present invention;

FIG. 2 is a side elevation view of the saw blade of the present invention;

FIG. 3 is a fragmentary end view taken in cross-section showing the blade of the present invention mounted on a saw arbor;

FIG. 4 is a fragmentary end view taken in cross-section showing the blade of the present invention mounted on a saw arbor in a manner opposite to that shown in FIG. 3; and FIG. 5 is a fragmentary end view showing the blade of the present invention cutting into a workpiece.

DETAILED DESCRIPTION OF A PREFERRED EMBODIMENT

Referring now in detail to the drawings, there is shown in FIG. 1 a circular saw blade constructed according to the present invention and designated generally by reference numeral 10. The blade 10 is particularly adapted for making smooth, finished cuts in wood, and comprises a primary saw blade 12 and a secondary saw blade 14, both formed as circular saw blades.

The primary saw blade 12 is similar to a conventional crosscut or ripsaw blade. It is preferably about 10 inches in diameter and about 1/16 of an inch thick. Although the invention is not limited to any particular design or arrangement of teeth, the preferred embodiment of the primary saw blade 12 has twenty-eight (28) to forty-four (44) teeth, extending along the peripheral edge thereof, and designated by reference numeral 16 in the drawings. However, the primary saw blade 12 may have as many as eighty (80) teeth or more without departing from the principles of the present invention. The teeth 16 of the primary saw blade 12 are preferably designed to make a comparatively coarse cut, such as would be made by a conventional crosscut or ripsaw blade.

The secondary saw blade 14 is preferably about 9 inches in diameter and about ⅛ of an inch thick, and is intended to cut with a smooth or finished cut surface. As with the primary saw blade 12, the present invention is not limited to any particular design or arrangement of teeth on the secondary saw blade 14, except to the extent necessary to accomplish the objectives of the invention. The secondary saw blade 14 preferably has a tooth arrangement similar to that of a saw blade designed for smooth or finish cuts. Thus, the secondary saw blade 14 will generally have a greater number of smaller, more closely-spaced teeth than the teeth of the primary saw blade 12. A preferred embodiment of the secondary saw blade 12 has one hundred twenty-eight (128) teeth, designated by numeral 18, although the number of teeth may vary.

As can be seen in FIG. 1, the secondary saw blade 14 has a central hub region 20 having a central bore 22 extending axially through the center. The primary saw blade 12 likewise has a central bore 24 extending axially through the center thereof.

The secondary saw blade 14 has an arrangement of pins 26 extending transversely through and projecting an equal distance from both sides of the hub 20. The primary saw blade 12 has a corresponding arrangement of holes 28 extending through the central region thereof surrounding the central bore 24 such that the pins 26 engage the holes 28 of the primary saw blade 12. Preferably, there are three pins arranged at 120° intervals around and at the same radial spacing from the center of the blade.

Since the pins 26 extend from both sides of the secondary saw blade 14, the primary saw blade 12 can be mounted on either side of the secondary saw blade 14. As seen in FIGS. 3 and 4, a flat, washer-like disc 30 is adapted to fit on the pins 26 projecting from the side of the secondary saw blade 14 opposite the side to which the primary saw blade 12 is attached.

The arrangement of the blades 12, 14 and disc 30 is adapted to be mounted to a conventional saw arbor 32 in a known manner, such as, for example, by means of a conventional collar 33 and nut 34 threaded to a threaded portion of the arbor 32, as shown in FIGS. 3 and 4.

By mounting the blades 12, 14 closely adjacent one another, the thickness of the secondary saw blade 14 adds stability to the thinner primary saw blade 12. That stability reduces vibration and wobbling of the primary saw blade 12, allowing it to make a more precise, cleaner and quicker cut.

Preferably, alternate teeth 16 of the primary saw blade 12 are set laterally to opposite sides at angles of about 5° with respect to the central plane of the blade. Because of the set of teeth 16 as the blade is fed into a workpiece 36 to be cut in the direction of arrow A (FIGS. 1 and 5), the teeth 16 of the primary saw blade 12 not only cut a path into the wood workpiece along the plane of the primary saw blade 12, but also cut away a portion of the wood in the planar path of the secondary saw blade 14. Thus, as can be seen in FIG. 5, the secondary saw blade 14 does not have to cut through a path of wood equal to its entire width because the teeth 16 of the primary saw blade 12 previously cut away a portion of the wood in the path of the secondary saw blade 14.

Since the secondary saw blade 14 does not cut a full path of wood, it is capable of cutting at a faster rate than would otherwise be possible. In addition, since the teeth 18 on the secondary saw blade 14 are small, the cut wood surface adjacent the secondary saw blade 14 has a smooth finish and does not require further sanding, planing, or other finishing.

The blade 10 of the present invention can be combined with other saw blade features to further improve its efficiency. For example, a shallow annular recess 38 may be formed on both outside surfaces of the secondary saw blade 14 as seen in FIGS. 1 and 2. The groove 38 reduces the friction and consequent burning that could be caused by the side of the blade rubbing against the cut surface of the wood. The groove 38 is preferably formed on both sides of the secondary saw blade 14 to allow for reversing of the two blades 12, 14.

Another feature that may be incorporated in the saw blade of the present invention is the provision of notches 40 selectively placed around the outer periphery of the secondary saw blade 14 to facilitate the dispersal of sawdust and wood chips.

Depending on the size and shape of the teeth 16 of the primary saw blade 12, the blade of the present invention may be used either for ripping along the grain of the wood or for crosscutting across the wood grain.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A saw blade comprising:
   a first saw blade having a plurality of teeth projecting radially from a periphery thereof;
   a second saw blade having a plurality of teeth projecting radially from a periphery thereof, said second saw blade having a greater number of teeth than the first saw blade;
   the first saw blade having a greater diameter and smaller thickness than the second saw blade, the teeth of the first saw blade being larger than the teeth of the second saw blade; and
   means for coaxially mounting the first and second saw blades together.

2. The saw blade according to claim 1, wherein some of the teeth of the first saw blade are laterally set at an angle from the plane of the first saw blade.

3. The saw blade according to claim 2, wherein some of the teeth of the first saw blade are laterally set to both sides of the plane of the first saw blade.

4. The saw blade according to claim 1, wherein the second saw blade has an annular recess in one side thereof.

5. The saw blade according to claim 1, wherein the second saw blade section includes a raised hub at its center.

6. The saw blade according to claim 1, wherein said mounting means comprises a plurality of mounting pins extending from the second blade and a corresponding plurality of holes in the first saw blade, the mounting pins fitting into the holes.

7. A saw blade comprising:
   first blade means for cutting a first path through a material comprising a first circular saw blade;
   second blade means thicker than the first blade means and mounted adjacent the first blade means for cutting a second path through the material, said second blade means comprising a second circular saw blade;
   first teeth mounted on the periphery of the first blade means, said teeth being set at an angle with respect to the plane of the first blade means such that said first teeth extend partially into the plane of the second blade means;
   second teeth on the periphery of the second blade means, said second teeth being recessed from the first teeth and being smaller than the first teeth for making a smoother cut than the first teeth;
   whereby the first teeth are arranged to cut away a partial path in the material for the second blade means.

8. The saw blade according to claim 7, wherein the second blade means has an annular recess in at least one side thereof.

9. The saw blade according to claim 8, wherein the second blade means includes a raised hub at its center.

10. The saw blade according to claim 7, further comprising a plurality of mounting pins extending from the second blade means and a corresponding plurality of holes in the first blade means, the mounting pins fitting into the holes for purposes of mounting the two blade sections together.

11. The saw blade according to claim 7, wherein the second blade means has annular recesses in both sides thereof.

12. The saw blade according to claim 1, wherein the first saw blade has 28 to 44 teeth.

13. The saw blade according to claim 12, wherein the second saw blade has 128 teeth.

14. The saw blade according to claim 1, wherein the first saw blade has a diameter of about 10 inches and is about 1/16 inch thick.

15. The saw blade according to claim 14, wherein the second saw blade has a diameter of about 9 inches and is about ⅛ inch thick.

16. The saw blade according to claim 1, wherein the second saw blade has annular recesses in both sides thereof.

* * * * *